(12) United States Patent
Dash et al.

(10) Patent No.: US 10,489,854 B2
(45) Date of Patent: Nov. 26, 2019

(54) CONDITIONAL TRANSACTION OFFER SYSTEM AND METHOD

(71) Applicant: Credible Labs Inc., San Francisco, CA (US)

(72) Inventors: Stephen James Dash, San Francisco, CA (US); George Matthew Raptis, New York, NY (US); Brian Gregory Lucas, San Francisco, CA (US)

(73) Assignee: Credible Labs, Inc., San Francisco, CA (US)

( * ) Notice: Subject to any disclaimer, the term of this patent is extended or adjusted under 35 U.S.C. 154(b) by 911 days.

(21) Appl. No.: 14/629,201

(22) Filed: Feb. 23, 2015

(65) Prior Publication Data

US 2016/0019642 A1    Jan. 21, 2016

Related U.S. Application Data

(60) Provisional application No. 61/943,426, filed on Feb. 23, 2014.

(51) Int. Cl.
  *G06Q 40/00* (2012.01)
  *G06Q 40/02* (2012.01)
(52) U.S. Cl.
  CPC .................. *G06Q 40/025* (2013.01)
(58) Field of Classification Search
  CPC ........................ G06F 17/60; G06Q 40/025
  USPC ........................................................ 705/38
  See application file for complete search history.

(56) References Cited

U.S. PATENT DOCUMENTS

| | | | |
|---|---|---|---|
| 7,418,410 B2 * | 8/2008 | Caiafa | G06Q 30/06 705/26.61 |
| 9,413,763 B2 * | 8/2016 | Raisanen | H04W 24/04 |
| 2006/0053290 A1 * | 3/2006 | Randle | G06Q 20/027 713/169 |

(Continued)

OTHER PUBLICATIONS

Silk Road Theory and Practice Jul. 11, 2011 (Year: 2011).*

*Primary Examiner* — Bruce I Ebersman
(74) *Attorney, Agent, or Firm* — Kwan & Olynick LLP

(57) ABSTRACT

The present invention involves a system and method for coordinating the centralization of the submission of requests for offers for credit and receipt of offers for credit between an internet user and a plurality of lending institutions via the internet. This method involves the use of a single offer request form, which is the combination of required lender information from consumer credit processes, and the receipt of information from the user, and various semi-automated online processes, to populate that single offer request form. After receiving this data, a special computer, or server, sorts the information and applies a filter to the data. The filter prepares that information for submission to lending institutions so that the lending institution may process the information and make a decision as to whether to offer the internet user credit. Once the data has been filtered, it is transmitted to a multiple number of lending institutions, or alternatively evaluated using a model of the lending institutions criteria. The method then allows for the lending institutions to submit responses on the information submitted back to the user and for those responses to be controlled and coordinated and displayed on an online account specific to the internet user via the internet.

20 Claims, 18 Drawing Sheets

(56) References Cited

U.S. PATENT DOCUMENTS

| | | | |
|---|---|---|---|
| 2007/0005492 A1* | 1/2007 | Kim | G06Q 20/02 |
| | | | 705/39 |
| 2010/0121775 A1* | 5/2010 | Keener, Jr. | G06Q 30/02 |
| | | | 705/347 |
| 2013/0151493 A1* | 6/2013 | Roth | H04N 21/2343 |
| | | | 707/703 |
| 2015/0371324 A1* | 12/2015 | Kumar | G06F 15/00 |
| | | | 705/26.3 |

\* cited by examiner

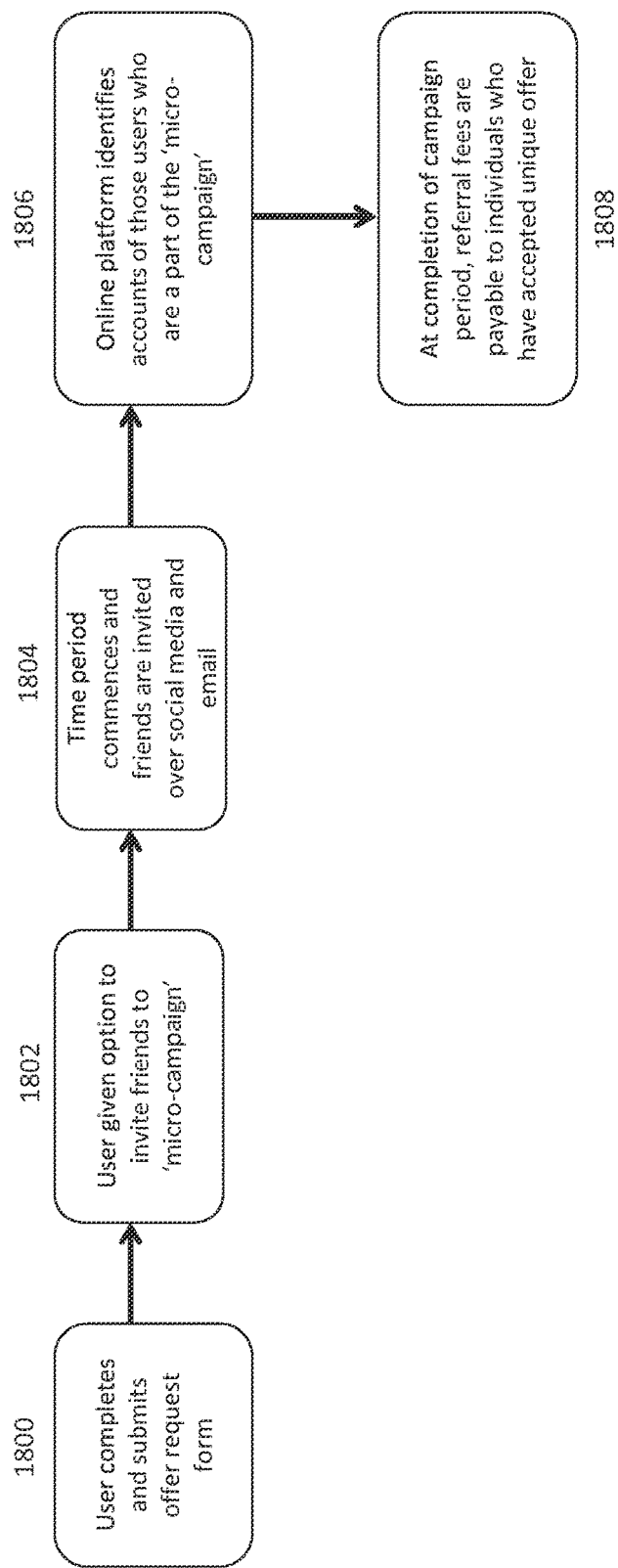

CONDITIONAL TRANSACTION OFFER SYSTEM AND METHOD

CROSS REFERENCE TO RELATED APPLICATIONS

The present application claims priority under 35 U.S.C. § 119(e) of U.S. Patent Provisional Application Ser. No. 61/943,426, filed on Feb. 23, 2014, the disclosures of which are incorporated by reference herein.

BACKGROUND OF THE INVENTION

Field of the Invention

The invention relates to administrative software. More specifically, the field of the invention is that of an online administrative platform for facilitating consumer credit transactions electronically.

Description of the Related Art

For a borrower, refinancing student loans is a tedious process. In order to evaluate the market, an individual must submit multiple forms, to multiple lenders, which takes time and effort. To receive personalized offers from multiple lending institutions, an individual would ordinarily have to undertake the process of physically completing several lender application forms (either at each lender place of business or online), or complete an application process through other direct means of communication with each lender (for example, over the telephone). That individual would then have to review each lender response and interpret multiple pages of information in order to compare any lender offers. This is a time consuming process that is not only de-centralized, but also inefficient.

SUMMARY OF THE INVENTION

The present invention is a conditional transaction offer request system and method which allows a user to obtain personalized conditional offers from the potential transaction partners in one central location. In one embodiment, the user signs onto the online administrative platform, agrees to loan product terms and disclosures that are required to satisfy lenders and various laws, and provides information specific to the user in order to obtain loan offers. The potential transaction partner, a lender, receives the offer request inquiry through the administrative platform, and is provided with the personal information needed to create an offer but communicate with the user indirectly via an e-mail proxy service which is routed through the administrative platform. The administrative platform records and date stamps the user interaction so that the lenders may rely on the user's information for creating a conditional offer that will be able to progress to the stage of an actual transaction. The potential transaction partner receives the personal information through an API, web form, pdf form, FTP, encrypted email or other electronic submission method so that the transaction partner may perform an assessment of the user's suitability for an offer according to the transaction partner's criteria for making an offer. All login information and other communication with the transaction partners hit the e-mail proxy service so that the administrative platform manages the communications with the transaction partner.

Embodiments of the invention provide a simple centralized form whereby an internet user may submit the centralized form to an online platform. That form collects the information that lenders in the market require in order to make an offer to an individual to refinance her or his loans. Once completed, the information in that form is submitted to potential transaction partners for assessment. This means that a borrower may arrive at the administrative platform via an internet connection, enter their details in one form, then submit that one form to the administration platform which the administrative platform then submits to lenders. In one embodiment, the submission is made through a lender API. In another embodiment, the submission of the information is made to a lender's online portal, either manually or via an automated process like a JAVA applet or an FTP (File Transfer Protocol) transmission.

Lender criteria is then applied to the information received from the administrative platform (a user's suitability for offers is assessed under the lender's criteria) and then a response is sent back to the administrative platform. In one embodiment, the submitted user information is processed directly by the lender and a response generated. In another embodiment, the submitted user information is sent to a centralized lender defined decision model (LDDM) that contains criteria provided by each lender, which then performs an assessment of a user's suitability for a product offering. In either form, a response is generated relating to the individual user's submission. The administrative platform then processes the lender responses, and populates those responses in a user profile/dashboard. The user then receives either instantaneously provided lender responses or subsequent email notifications of lender responses and may log-in to the administrative platform to review the lender responses.

Once that information is assessed by each lender (either through the LDDM or directly by the lenders) the online administrative platform then receives personalized lender responses (as opposed to broad market information) pertaining to the specific user offer request. The online platform then presents each lender response on a centralized online dashboard within the internet user's online account on the website, allowing the user to compare lender responses in one central location as a means of informing themselves of their refinancing options with each lender that has submitted a response.

A user may receive responses from lenders by accessing their personal account via the administrative platform. From this point the user may continue to access unique 'login' details that provides them with access to a unique lender profile to pursue any offers. In one embodiment, this is the end of the administrative platform's involvement with the user's search to find an offer to refinance their loans and a user may complete the loan acceptance process directly with a chosen lender. In another embodiment, a user is able to complete loan documents and accept an offer directly within the administrative platform, which then provides completed documentation directly to a lender. In any case, a user may continue to access lender-specific responses within the administrative platform. The user also remains an 'active' registered user of the administrative platform, meaning that their administrative platform account details remain active for any future offers that may be made available to them.

The offer request system includes an administrative online platform which simplifies the process of a user submitting offer requests and receiving offers from lenders. In submitting an offer request form with the administrative platform, the user is using the platform's functionality to avail themselves of offers.

The function of the administrative platform is that users complete their information in one single offer request form. In order for a user to receive offers from lenders, the user submits their offer request form to the administrative platform, which then submits the user's information for assessment by lenders. In some embodiments, the administrative platform takes the information submitted by a user and translates it into a form that is compatible with lender processes. Practically speaking, this may be achieved through API integration, via e-mail, submission of the user's information on a lender's own website in the form (e.g., an interactive online form or a PDF file) specified by the lender, or through use of an XML form for communication of offer request data.

In another embodiment of the invention, rather than the administrative platform submitting a User's information directly to the lender, the administrative platform facilitates a centralized location for the submission of previously provided user information known as the 'Lender Defined Decision Model' (LDDM). The LDDM is an independently moderated decision matrix which allows lenders to provide criteria relevant to their product decision process to a decision model functioning within the administrative platform. The LDDM is protected by an independent third party which creates an information barrier or 'Chinese Wall' of sorts around the lender decision criteria so that those criteria may not be accessed by the operator of the administrative platform, thereby protecting the integrity of the LDDM and sensitive lender processes and information. The administrative platform provides user information to the LDDM, along with various third party-accessed information required by the lenders to make a decision on a User's suitability for an offer, for example, credit reporting information relating to an individual user. The LDDM then takes all of the information required by a lender and generates a decision against the lender criteria on whether that User should be offered a loan refinancing product. The response to that calculation or decision is then provided back through the administrative platform and displayed on a User's account dashboard, and presented in the typical manner as though a lender had ordinarily responded to the User's offer request submission. The utility of this process being that rather than a User requiring multiple credit checks or a lender having to undertake existing lengthy internal processes to provide a preliminary assessment of suitability for an offer, the process is simplified by virtue of one single credit check via third party information, and lender criteria for assessment of user suitability is contained within one central model the responses to which may be provided by virtue of the connection between the LDDM and the user's account on the administrative platform.

In one embodiment, the administrative platform uses a legal construct known as a 'Limited Power of Attorney' or LPA to achieve submission of a user's information to lenders, and the user (via the granting of the LPA to a third party administrative platform/appointment of the third party administrative platform as attorney-in-fact and agent in the same capacity as the user) authorizes the administrative platform to do this. In another embodiment, the administrative platform obtains broad consent from the user to make the applications to lending institutions. In one embodiment, lender disclosures are made to the user at the beginning of the process and then a second viewing of those disclosures are made near the end of the process prior to final submission of the information, with such viewings being recorded and time stamped. This ensures that a user and lender have satisfied the necessary disclosure requirements under various laws for a lender to make a conditional offer to a user.

It is an object of the present invention to provide a fast, simple and convenient process for an individual user to avail themselves of actual conditional offers for credit from lending institutions. The invention eliminates the need for repetitive de-centralized process under which users would have to submit information to lenders.

It is a further object of the present invention to provide a universal offer request form over the internet which may then be submitted to multiple lenders who then evaluate the information and provide responses to that offer request (in the form of an offer or rejection) to users via the internet.

It is a further object of the present invention to provide a central location for users to compare and receive responses from lenders in order to make an informed decision about their options for loan offers.

To achieve these and other objects of the invention, there is provided a method and apparatus/platform for coordinating the online completion of a tool which compares an individual user's basic unique profile information (such as existing loan balance, year of graduation and other information) and comparing that information with a pre-aggregated set of data which models similar users, as well as a general data set.

A user is then displayed a broad comparison and invited to make a decision as to whether they wish to proceed to the next stage of the process, being a universal offer request form.

The universal offer request form is some combination of information frequently included in the required fields that lenders in the market require to be completed in order to make a decision as to whether they wish to make a conditional offer to the user for credit. In one embodiment, a subset of all of the requested information is obtained, and in other embodiments more information is provided than absolutely necessary.

The credit market that this invention may be applied to includes student loans, personal loans, car loans, mortgages, and credit card applications. It may also be used for non-credit loan based products, such as insurance, the provision of electricity, cable television, telephony and other products to residential premises. Other types of credit and non-credit based offer requests may exist without departing from the spirit of the invention.

Next, the user completes the required information in the offer request form, which is then submitted to the central database, and then filtered for transmission to the various lenders according to their unique information requirements.

The filtering process may occur in a number of ways, including manual filtering (by human review of the data) and Application Programming Interface (API) integration between the lender and the online platform against the lender's information requirements, and/or filtering performed on XML files. The information may also be prepared for submission to the LDDM which makes an assessment based on lender-specific criteria without the need for submission directly to lender in order to obtain a decision on an offer request.

The information, once filtered into a form capable of review by the lender, may then be transmitted to the lender in a number of ways, including via online submission on the lender's website, API integration with the lender's website via a secure webpage, encrypted email, or other online forms of transmission.

As much of the information relayed between the network of computers involved in the invention and the lenders is private information, it is encrypted before it is sent from one computer to another.

In further embodiments of the present invention, the administrative platform provides the user with the ability to invite further individuals who may also use the administrative platform. The administrative platform tracks the progress of those other individuals towards completing a refinancing event, and rewards both the initial user and invitees upon sufficient additional participation. In one embodiment, rewards may take the form of a referral fee. In another embodiment, rewards may take the form of a product discount for participation of the group. Thus, the initial users are motivated to campaign with those additional individuals in order to access a group discount and/or referral fees, as would any subsequent invitees. Invites may be sent, for example, to friends on a social network, or existing personal contact list, to have those individuals sign up and use the administrative platform.

An illustrative embodiment of the invention involves a server for coordinating multiple vendor requests from a single user. The server has a processor and associated memory with a network communications system. The server includes software such as a user interaction module adapted to obtain user information and store user information, including a User Authorization module for storing of user authentication and user affirmation. The server software also has a vendor interaction module adapted to obtain vendor information requirements and fulfill vendor information requirements from the stored user information. The server also has an anonymous email interaction module for creating anonymous email accounts for managing some user interactions with a vendor. The anonymous email interaction module creates an e-mail account for the vendor interaction module to use to communicate with the users. The anonymous email interaction module also manages email to the user through the user interaction module. The User Authorization module is adapted to perform multiple times for each user interaction, and is further adapted to store dated and time-stamped information. In one aspect, the User Authorization module stores user affirmation of user consent, which may include the details of the user consent, and in another aspect stores user affirmation of a limited power of attorney. The vendor interaction module provides stored user information to a vendor server using an interactive connection, or using an application program interface (API), or using a browser based applet, or using a file transfer protocol transmission. A server also operates an independently moderated decision model whereby a user's information may be reviewed according to vendor-provided criteria stored on that server, which facilitates the making and provision of a decision as to a user's eligibility for an offer, directly from the decision model server.

The invention also involves a method for coordinating multiple vendor requests for a transaction from a single user using a server. User information related to the transaction is obtained by communication with a user computer over a network, and User Authorization is also obtained by communication with a user computer over a network, with the User Authorization including user authentication and user affirmation. The user information, user authentication and user affirmation is stored, and the vendor information requirements are fulfilled from the stored user information. Operating an anonymous email interaction module allows for creating anonymous emails accounts and managing interaction of the user with the vendor, for example in the case of lenders that are not directly connected to the administrative platform via features such as the LDDM, the anonymous email accounts may filter lender responses which are otherwise provided to the personal email of a user.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 18 is a flow chart diagram of the operation of the present invention relating to the micro-campaign model operation in one embodiment of the invention.

Figure 1:
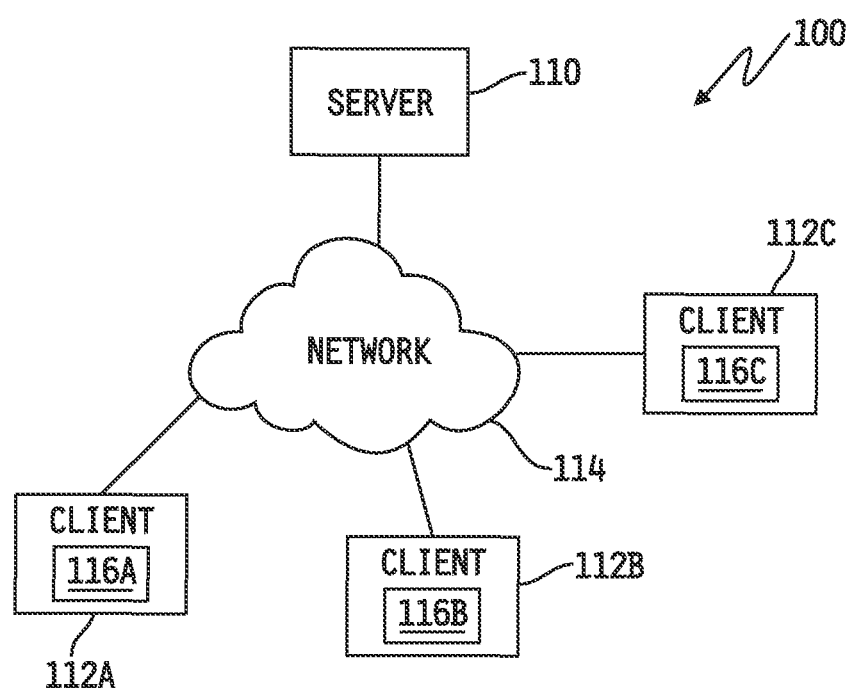
FIG. 1 is a schematic diagrammatic view of a network system in which embodiments of the present invention may be utilized.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of embodiments of the present invention; the operations are machine operations. Useful machines for performing the operations of embodiments of the present invention include general purpose digital computers or other similar devices. In all cases the distinction between the method operations in operating a computer and the method of computation itself should be recognized. The various embodiments of present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of an instruction.

Some embodiments of the present invention also relate to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipment through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

Embodiments of the present invention may deal with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system may be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which may be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks may access the network resources, such as shared data files, common peripheral devices, and inter-workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis. A "module" refers to a portion of a computer system and/or software program that carries out one or more specific functions and may be used alone or combined with other modules of the same system or program.

The term "desktop" means a specific user interface which presents a menu or display of objects with associated settings for the user associated with the desktop. When the desktop accesses a network resource, which typically requires an application program to execute on the remote server, the desktop calls an Application Program Interface, or "API", to allow the user to provide commands to the network resource and observe any output. The term "Browser" refers to a program which is not necessarily apparent to the user, but which is responsible for transmitting messages between the desktop and the network server and for displaying and interacting with the network user. Browsers are designed to utilize a communications protocol for transmission of text and graphic information over a world wide network of computers, namely the "World Wide Web" or simply the "Web". Examples of Browsers compatible with embodiments of the present invention include the Chrome browser program developed by Google Inc. of Mountain View, Calif. (Chrome is a trademark of Google Inc.), the Safari browser program developed by Apple Inc. of Cupertino, Calif. (Safari is a registered trademark of Apple Inc.), Internet Explorer program developed by Microsoft Corporation (Internet Explorer is a trademark of Microsoft Corporation), the Opera browser program created by Opera Software ASA, or the Firefox browser program distributed by the Mozilla Foundation (Firefox is a registered trademark of the Mozilla Foundation). Although the following description details such operations in terms of a graphic user interface of a Browser, embodiments of the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method). Similarly, JavaScript Object Notation (JSON) may be used to convert between data file formats.

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a first device, e.g. a handheld device, and a second device, e.g. a desktop computer, either via wires or wirelessly. Synchronization ensures that the data on both devices are identical (at least at the time of synchronization).

In wireless wide area networks, communication primarily occurs through the transmission of radio signals over analog, digital cellular or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), Third Generation (wideband or "3G"), Fourth Generation (broadband or "4G"), personal digital cellular ("PDC"), or through packet-data technology over analog systems such as cellular digital packet data ("CDPD") used on the Advance Mobile Phone Service ("AMPS").

The terms "wireless application protocol" or "WAP" mean a universal specification to facilitate the delivery and presentation of web-based data on handheld and mobile devices with small user interfaces. "Mobile Software" refers to the software operating system which allows for application programs to be implemented on a mobile device such as a mobile telephone or PDA. Examples of Mobile Software are Java and Java ME (Java and JavaME are trademarks of Sun Microsystems, Inc. of Santa Clara, Calif.), BREW (BREW is a registered trademark of Qualcomm Incorporated of San Diego, Calif.), Windows Mobile (Windows is a registered trademark of Microsoft Corporation of Redmond, Wash.), Palm OS (Palm is a registered trademark of Palm, Inc. of Sunnyvale, Calif.), Symbian OS (Symbian is a registered trademark of Symbian Software Limited Corporation of London, United Kingdom), ANDROID OS (ANDROID is a registered trademark of Google, Inc. of Mountain View, Calif.), and iPhone OS (iPhone is a registered trademark of Apple, Inc. of Cupertino, Calif.), and Windows Phone 7. "Mobile Apps" refers to software programs written for execution with Mobile Software.

In the following specification, the term "social network" may be used to refer to a multiple user computer software system that allows for relationships among and between users (individuals or members) and content assessable by the system. Generally, a social network is defined by the relationships among groups of individuals, and may include relationships ranging from casual acquaintances to close familial bonds. In addition, members may be other entities that may be linked with individuals. The logical structure of a social network may be represented using a graph structure. Each node of the graph may correspond to a member of the social network, or content assessable by the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Social networks may comprise any of a variety of suitable arrangements. An entity or member of a social network may have a profile and that profile may represent the member in the social network. The social network may facilitate interaction between member profiles and allow associations or relationships between member profiles. Associations between member profiles may be one or more of a variety of types, such as friend, co-worker, family member, business associate, common-interest association, and common-geography association. Associations may also include intermediary relationships, such as friend of a friend, and degree of separation relationships, such as three degrees away. Associations between member profiles may be reciprocal associations. For example, a first member may invite another member to become associated with the first member and the other member may accept or reject the invitation. A member may also categorize or weigh the association with other member profiles, such as, for example, by assigning a level to the association. For example, for a friendship-type association, the member may assign a level, such as acquaintance, friend, good friend, and best friend, to the associations between the member's profile and other member profiles.

Each profile within a social network may contain entries, and each entry may comprise information associated with a profile. Examples of entries for a person profile may comprise contact information such as an email addresses, mailing address, instant messaging (or IM) name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information or documents describing, identifying, or otherwise associated with a profile. Entries for a business profile may comprise industry information such as market sector, customer base, location, or supplier information; financial information such as net profits, net worth, number of employees, stock performance; or other types of information and documents associated with the business profile.

A member profile may also contain rating information associated with the member. For example, the member may be rated or scored by other members of the social network in specific categories, such as humor, intelligence, fashion, trustworthiness, sexiness, and coolness. A member's category ratings may be contained in the member's profile. In one embodiment of the social network, a member may have fans. Fans may be other members who have indicated that they are "fans" of the member. Rating information may also include the number of fans of a member and identifiers of the fans. Rating information may also include the rate at which a member accumulated ratings or fans and how recently the member has been rated or acquired fans.

A member profile may also contain social network activity data associated with the member. Membership information may include information about a member's login patterns to the social network, such as the frequency that the member logs in to the social network and the member's most recent login to the social network. Membership information may also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, may also comprise data relating to others. For example, a member profile may contain an identification of associations or virtual links with other member profiles. In one embodiment, a member's social network profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that may be recorded in the member's profile. According to one embodiment, associations may be established by an invitation and an acceptance of the invitation. For example, a first user may send an invitation to a second user inviting the second user to form an association with the first user. The second user may accept or reject the invitation. According to one embodiment, if the second user rejects the invitation, a one-way association may be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, may be referred to as user established associations.

Examples of social networks include, but are not limited to, facebook, twitter, myspace, linkedin, and other systems. The exact terminology of certain features, such as associations, fans, profiles, etc. may vary from social network to social network, although there are several functional features that are common to the various terms. Thus, a particular social network may have more of less of the common features described above. In terms of the following disclosure, generally the use of the term "social network" encompasses a system that includes one or more of the foregoing features or their equivalents.

FIG. 1 is a high-level block diagram of a computing environment 100 according to one embodiment. FIG. 1 illustrates server 110 and three clients 112 connected by network 114. Only three clients 112 are shown in FIG. 1 in order to simplify and clarify the description. Embodiments of the computing environment 100 may have thousands or millions of clients 112 connected to network 114, for example the Internet. Users (not shown) may operate software 116 on one of clients 112 to both send and receive messages network 114 via server 110 and its associated communications equipment and software (not shown).

Figure 2:
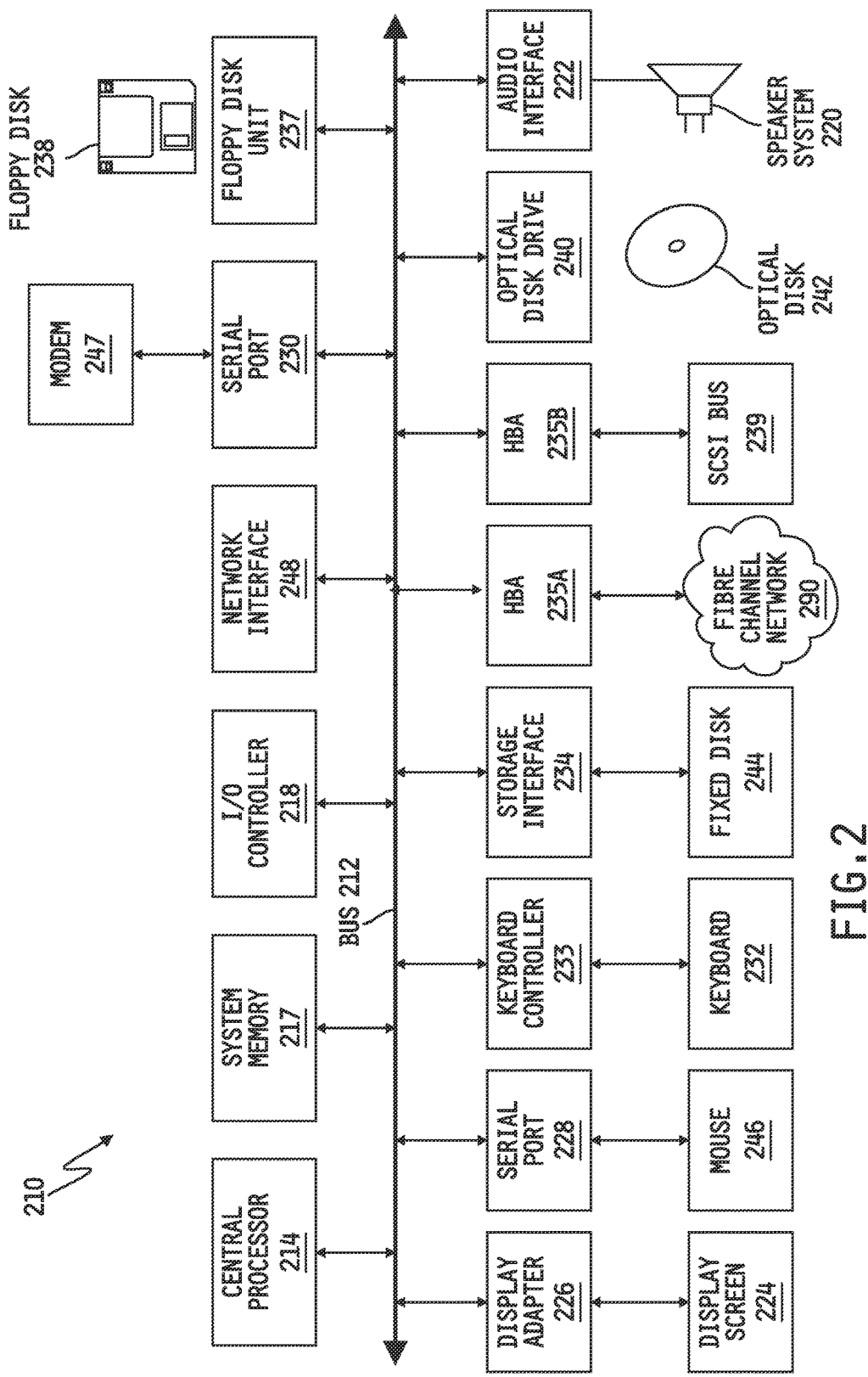
FIG. 2 is a block diagram of a computing system (either a server or client, or both, as appropriate), with optional input devices (e.g., keyboard, mouse, touch screen, etc.) and output devices, hardware, network connections, one or more processors, and memory/storage for data and modules, etc. which may be utilized in conjunction with embodiments of the present invention.

FIG. 2 depicts a block diagram of computer system 210 suitable for implementing server 110 or client 112. Computer system 210 includes bus 212 which interconnects major subsystems of computer system 210, such as central processor 214, system memory 217 (typically RAM, but which may also include ROM, flash RAM, or the like), input/output controller 218, external audio device, such as speaker system 220 via audio output interface 222, external device, such as display screen 224 via display adapter 226, serial ports 228 and 230, keyboard 232 (interfaced with keyboard controller 233), storage interface 234, disk drive 237 operative to receive floppy disk 238, host bus adapter (HBA) interface card 235A operative to connect with Fibre Channel network 290, host bus adapter (HBA) interface card 235B operative to connect to SCSI bus 239, and optical disk drive 240 operative to receive optical disk 242. Also included are mouse 246 (or other point-and-click device, coupled to bus 212 via serial port 228), modem 247 (coupled to bus 212 via serial port 230), and network interface 248 (coupled directly to bus 212).

Bus 212 allows data communication between central processor 214 and system memory 217, which may include read-only memory (ROM) or flash memory (neither shown), and random access memory (RAM) (not shown), as previously noted. RAM is generally the main memory into which operating system and application programs are loaded. ROM or flash memory may contain, among other software code, Basic Input-Output system (BIOS) which controls basic hardware operation such as interaction with peripheral components. Applications resident with computer system 210 are generally stored on and accessed via computer readable media, such as hard disk drives (e.g., fixed disk 244), optical drives (e.g., optical drive 240), floppy disk unit 237, or other storage medium. Additionally, applications may be in the form of electronic signals modulated in accordance with the application and data communication technology when accessed via network modem 247 or interface 248 or other telecommunications equipment (not shown).

Storage interface 234, as with other storage interfaces of computer system 210, may connect to standard computer readable media for storage and/or retrieval of information, such as fixed disk drive 244. Fixed disk drive 244 may be part of computer system 210 or may be separate and accessed through other interface systems. Modem 247 may provide direct connection to remote servers via telephone link or the Internet via an internet service provider (ISP) (not shown). Network interface 248 may provide direct connection to remote servers via direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. Devices and subsystems may be interconnected in different ways from that shown in FIG. 2. Operation of a computer system such as that shown in FIG. 2 is readily known in the art and is not discussed in detail in this application. Software source and/or object codes to implement the present disclosure may be stored in computer-readable storage media such as one or more of system memory 217, fixed disk 244, optical disk 242, or floppy disk 238. The operating system provided on computer system 210 may be a variety or version of either MS-DOS® (MS-DOS is a registered trademark of Microsoft Corporation of Redmond, Wash.), WINDOWS® (WINDOWS is a registered trademark of Microsoft Corporation of Redmond, Wash.), OS/2® (OS/2 is a registered trademark of International Business Machines Corporation of Armonk, N.Y.), UNIX® (UNIX is a registered trademark of X/Open Company Limited of Reading, United Kingdom), Linux® (Linux is a registered trademark of Linus Torvalds of Portland, Oreg.), or other known or developed operating system. In some embodiments, computer system 210 may take the form of a tablet computer, typically in the form of a large display screen operated by touching the screen. In tablet computer alternative embodiments, the operating system may be iOS® (iOS is a registered trademark of Cisco Systems, Inc. of San Jose, Calif., used under license by Apple Corporation of Cupertino, Calif.), Android® (Android is a trademark of Google Inc. of Mountain View, Calif.), Blackberry® Tablet OS (Blackberry is a registered trademark of Research In Motion of Waterloo, Ontario, Canada), webOS (webOS is a trademark of Hewlett-Packard Development Company, L.P. of Texas), and/or other suitable tablet operating systems.

Moreover, regarding the signals described herein, those skilled in the art recognize that a signal may be directly transmitted from a first block to a second block, or a signal may be modified (e.g., amplified, attenuated, delayed, latched, buffered, inverted, filtered, or otherwise modified) between blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
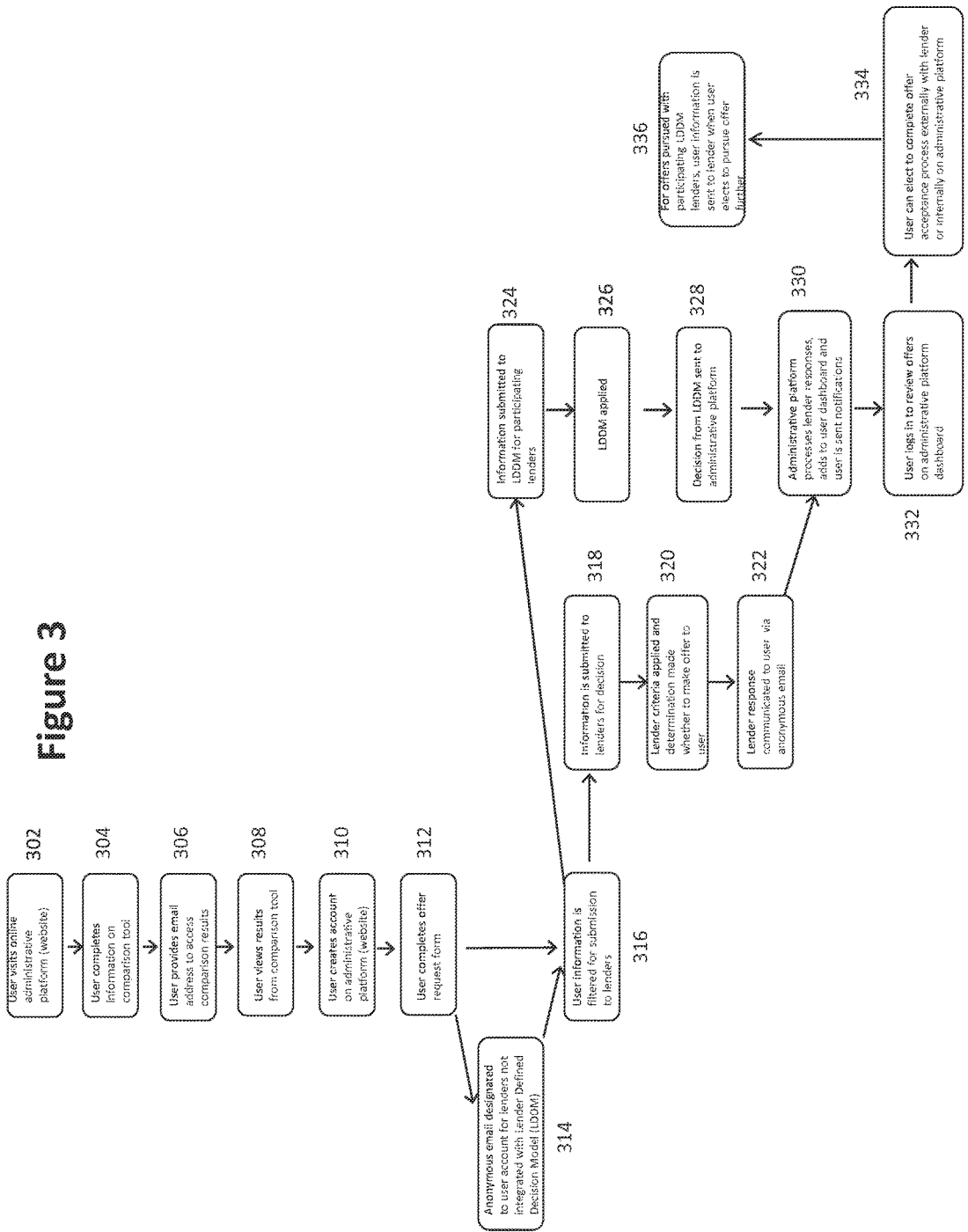
FIG. 3 is a flow chart diagram of the operation of the present invention relating to the general operation of the administrative platform in one embodiment of the invention.
Figure 4:
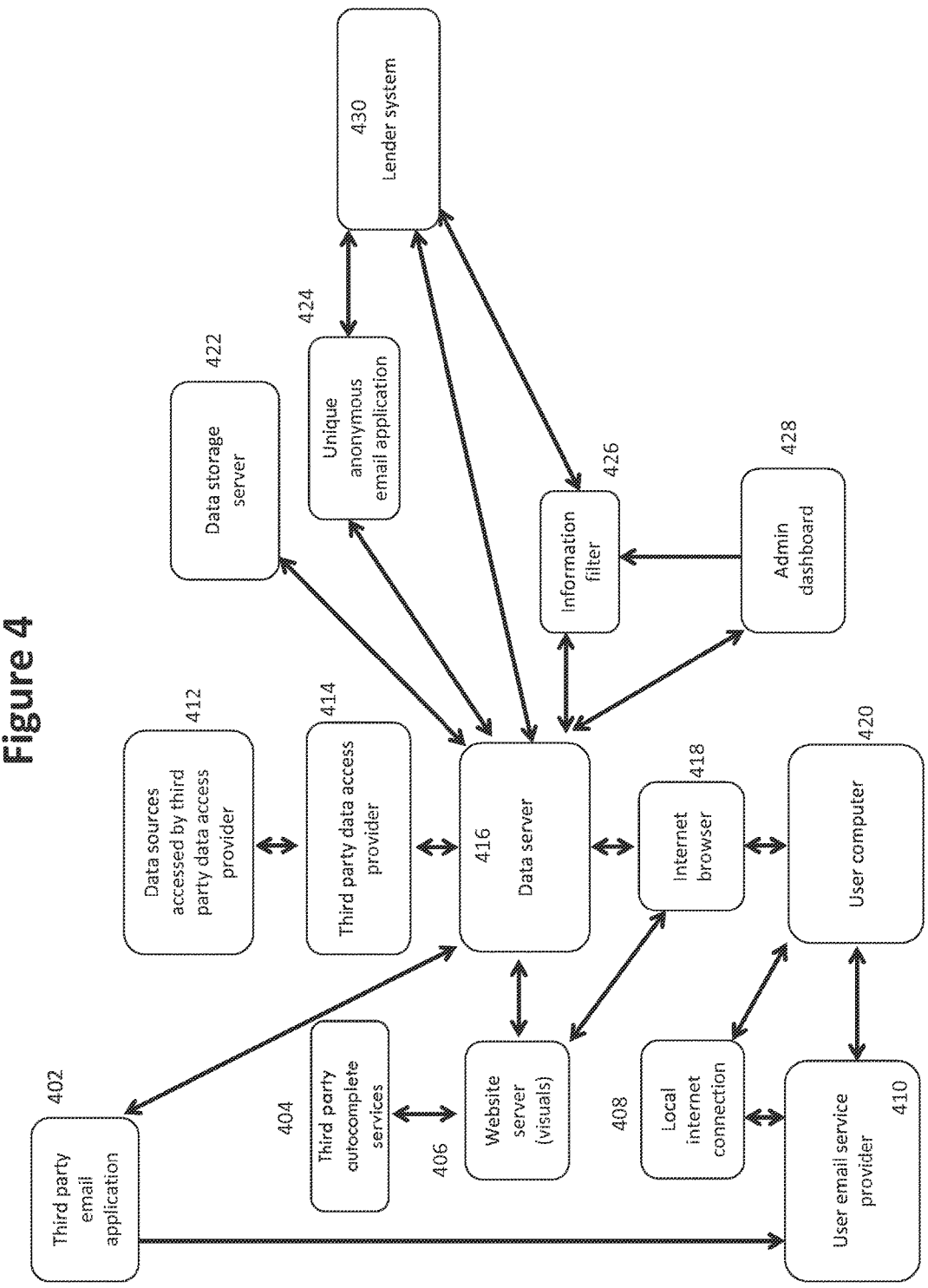
FIG. 4 is a schematic diagram of the network inter relations of the present invention in one embodiment of the invention.

FIGS. 3 and 4 show the general method and system, respectively, of an embodiment of the present invention. The various general method steps in FIG. 3 are detailed in the further flow chart FIG. 5-18, while the network of interaction with its various nodes are shown schematically in FIG. 4. In embodiments of the invention, the User participates in the process using a computing device such as a personal computer, a tablet, a smart phone, etc. communicating with the administrative platform over a wired and/or wireless connection. The administrative platform represents the server, web site, and software accessible to an online user to conduct the various operations described below, and may be a single or a plurality of networked devices coordinating interaction with the User and the refinancing lenders.

The overall method of one embodiment of the invention is illustrated in the flow chart organization of the steps in FIG. 3, using the nodes of FIG. 4, of the User entering personal information to obtain a plurality of conditional loan refinancing offers, in this embodiment student loan refinancing. First, the user with user computer (420) through local internet connection (408) and internet browser (418) goes to the web site (302), which is known as the 'administrative platform' (406) and provides initial personal and financial information (302) needed to compare basic loan information to a pre-aggregated data set (416), in this embodiment using a module termed the Comparison Tool (406). The User provides the administrative platform with an email address (304) from the user email service provider (410) which the administrative platform saves as part of the data from obtained from the Comparison Tool (422). The administrative platform then provides the User the results of the comparison from the Comparison Tool (308). The User then creates an account on the administrative platform (310) which then stores the User's account data (422). The User completes the administrative platform's universal offer request form (312), which the administrative platform stores as User data on the data storage server (422). Included in the administrative platform's interaction with the User involves the administrative platform obtaining and documenting the user's consent to the collection and submission of user information to potential transaction partners, student loan refinancing lenders, which may be by detailed personal consents and/or a limited power of attorney for submitting the refinancing offer request with various lenders. Such consents or limited powers of attorney are stored in a compartmentalized environment where the authenticity of the user, date, time-stamp, and user affirmation are verifiably stored as is known in the data authentication art (referred to hereinafter as "User Authorization"). The User's information is filtered through the administrative platform (316) to a decision module, for example in the form of LDDM 1006 (described in more detail with FIG. 10), or as an alternative example as an anonymous email is created on unique anonymous email application (424) and designated to the User (314) to enable the administrative platform to submit the User's form to lenders who do not participate in the administrative platform's LDDM. The User's information is submitted to lenders in a form that the lenders use to process and evaluate the refinancing offer request. This may be either directly to a lender (318), or to the LDDM (324) which is a centralized model which contains a lender decision matrix, built specifically to make an assessment of a user's suitability for an offer without the need for submission of information to each lender. At this point, the decision process has been split into lenders provided with direct access to the decision process and lenders that participate in the LDDM. For direct access lenders, processes and criteria are then applied to determine whether to make offer to the User (320). For LDDM lenders, criteria is applied to asses a user's suitability according to lender-provided criteria (326). In both cases, any offers made are a real offer, conditioned on the final information being provided as matching that of the initial data submission, and in the following description the use of the terms "offer" and "binding offer" refer to this type of offer that is conditional in the sense that the offer may only be accepted if the submitted information is verified by the lender.

The platform's functionality is to provide users with a central location to submit information across a product category and receive responses from transaction partners without having to enter user information on multiple occasions. For example, in other embodiments, the administrative platform may alternatively interact with refinancing personal loan potential transaction partners, in-school student loan potential transaction partners, and/or various insurance company potential transaction partners. Thus, while the present disclosure discusses embodiments specifically tailored to the student loan refinancing aspect of the present invention, alternative embodiments may be created to provide the indirect communication with conditional offers to these other potential transactions, with the administrative platform being specifically tailored to date, timestamp, and save interactions required for those other potential transactions, with the aim of providing a centralized location for users to simplify the process of interacting with multiple transaction partners.

Direct submission lenders communicate their response to the User via the anonymous email address (322). Conceptually, the administrative platform works two e-mail systems, a first email system that communicates directly with the User, and a second email system that sends and receives information from the lenders. The second email system also captures, saves, organizes, and communicates lender messages to the User, with the User optionally receiving lender information from emails of the first system and/or accessing the dashboard of the administrative platform, which provides information to the website server visuals (406) via the data server (416). A user is at that point able to view the lender information in an organized format. The administrative platform obtains the direct access lender responses from the anonymous email address and translates the responses from each lender to an entry on a User dashboard on the administrative platform (330). In the case of lenders participating in the LDDM, the LDDM sends lender offers directly to the administrative platform, and similarly displays them as an entry on a User dashboard. In both cases (LDDM and direct access), the administrative platform then sends an email to the User to indicate that lender responses are available, optionally the administrative platform may enable direct communication between the lender and the user. In the case of the LDDM, the User may also be able to instantaneously view responses from lenders. The User may then review the various offers on the User dashboard on the administrative platform (332). In one embodiment, the two conceptual email systems are maintained on a single server operated by the administrative platform. In another embodiment, the two conceptual email systems are implemented by third-party applications. In further embodiments of the invention, one of the conceptual email systems may be maintained and operated by the administrative platform and the other by a third-party application. A User may then be able to complete a lender's loan process either within the administrative platform or externally with the lender by accessing the lender's own online system. In another embodiment, the administrative platform would interact with the LDDM to determine when a User's information can be sent directly to a lender from the administrative platform.

Figure 5:
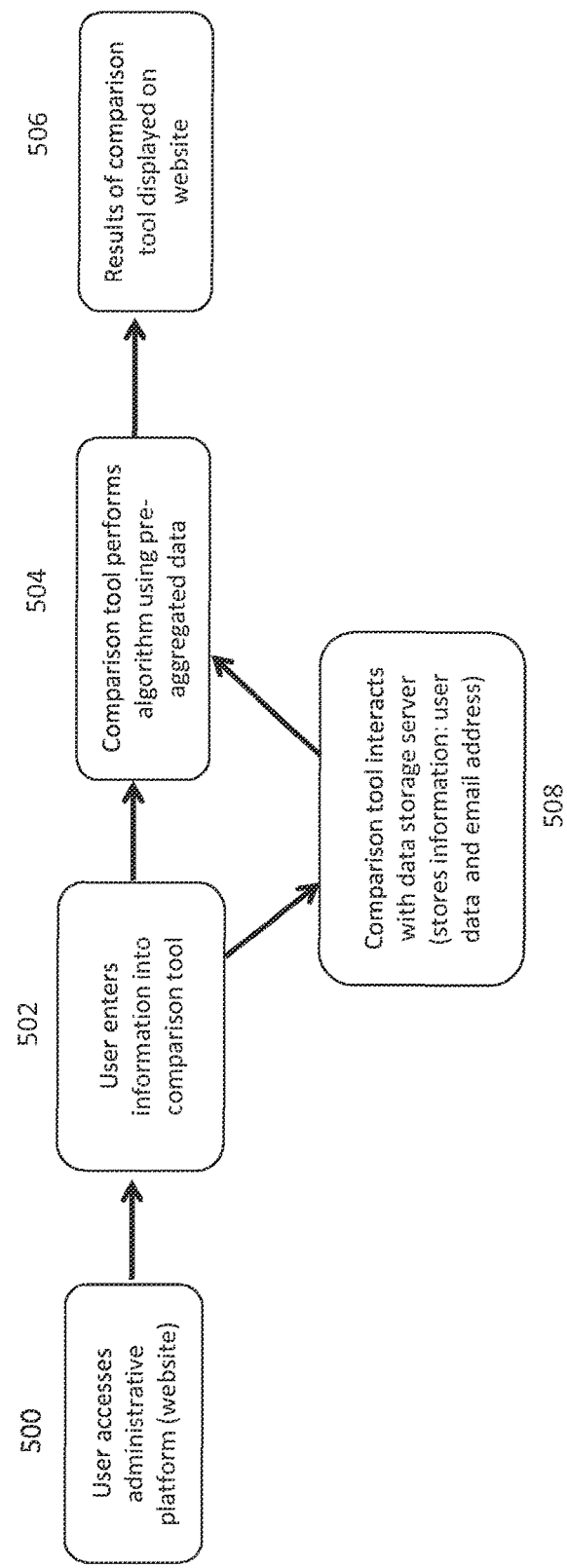
FIG. 5 is a flow chart diagram of the operation of the present invention relating to the Comparison Tool in one embodiment of the invention.

FIG. 5 shows the first step of the process for the user. When the User accesses the administrative platform (500), the User is prompted to enter information into the Comparison Tool module (502). The Comparison Tool module interacts with the data storage server to store the User's information (508), particularly the personal information needed to conduct a comparison of the User's data against a pre-aggregated data set and the User's email address. In one embodiment when a third-party email provider is used, the User email address is sent to a third party email provider. The User's email address is the main form of communication between the administrative platform and the User. The administrative platform performs an algorithm (504), called the Comparison Tool, which matches the User with the closest historical data on student loan refinancing using the User data stored on the data storage server in conjunction with a historical pre-aggregated data set. The algorithm provides a first estimate on the possible results of a refinancing offer request, and displays the Comparison Tool results to the User (506).

The User may optionally access the Comparison Tool that compares information provided by the User to information compiled by the administrative platform. The information compiled for purposes of the Comparison Tool is a composite of publicly available information and aggregate User data. The Comparison Tool is indicative only. The administrative platform provides the Comparison Tool without any warranties whatsoever about the information contained within the Comparison Tool nor its applicability or accuracy in regard to a particular circumstance. Information and interactive functions within the Comparison Tool are made available to the User as self-help tools for independent use and are not intended to provide investment advice. The administrative platform does not recommend that any User rely upon on the information provided through the Comparison Tool to make a decision about any Offer made by a Provider through the Service or for any other reason. Use of the Comparison Tool does not guarantee approval or qualification for any offer.

Figure 6:
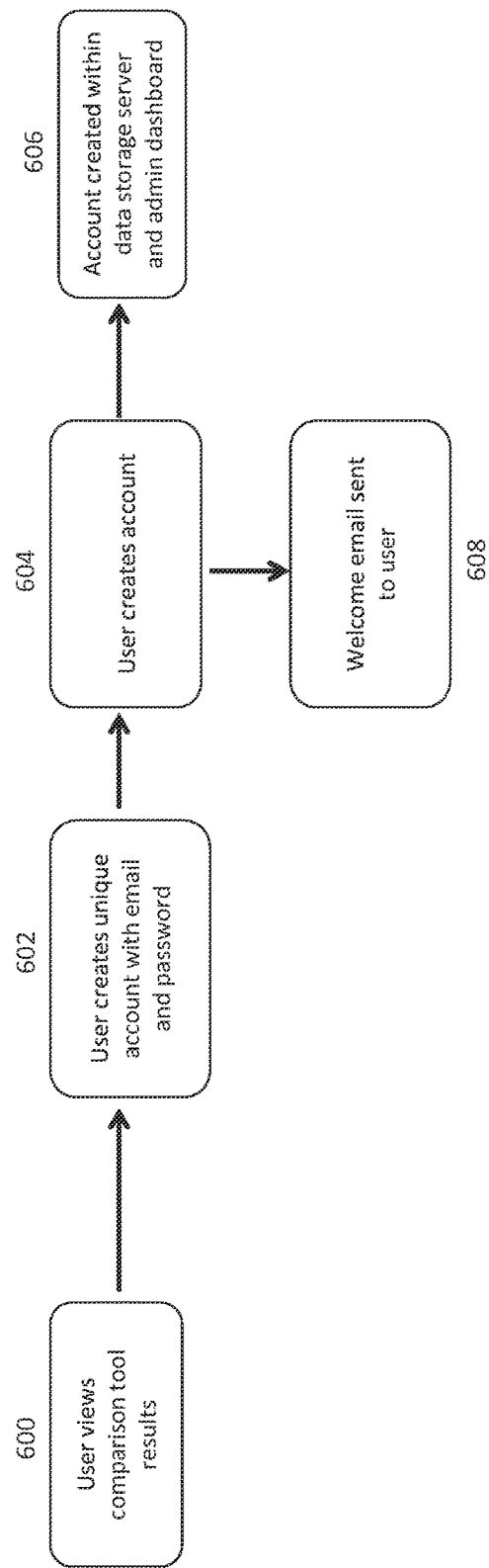
FIG. 6 is a flow chart diagram of the operation of the present invention relating to account creation in one embodiment of the invention.

FIG. 6 shows the User's initial interaction with the administrative platform. When the User views the Comparison Tool results (600), the administrative platform displays the User's account creation screen which is pre-populated from the email address provided in the administrative platform's data server. The User is prompted to enter a password for accessing the User-specific resources on the administrative platform (602). The User then clicks to create an account (604), which in one embodiment of the invention includes affirming to the administrative platform being granted a limited power of attorney to undertake certain business in place of the User, and in other embodiments includes broad User consents which enable the administrative platform to perform the function of filtering and submission of User information and the retrieval and presentation of lender responses. The User account is created within the data storage server of the administrative platform and associated with the admin dashboard (606). A 'welcome' email is sent to the User (608) acknowledging account creation.

Figure 7:
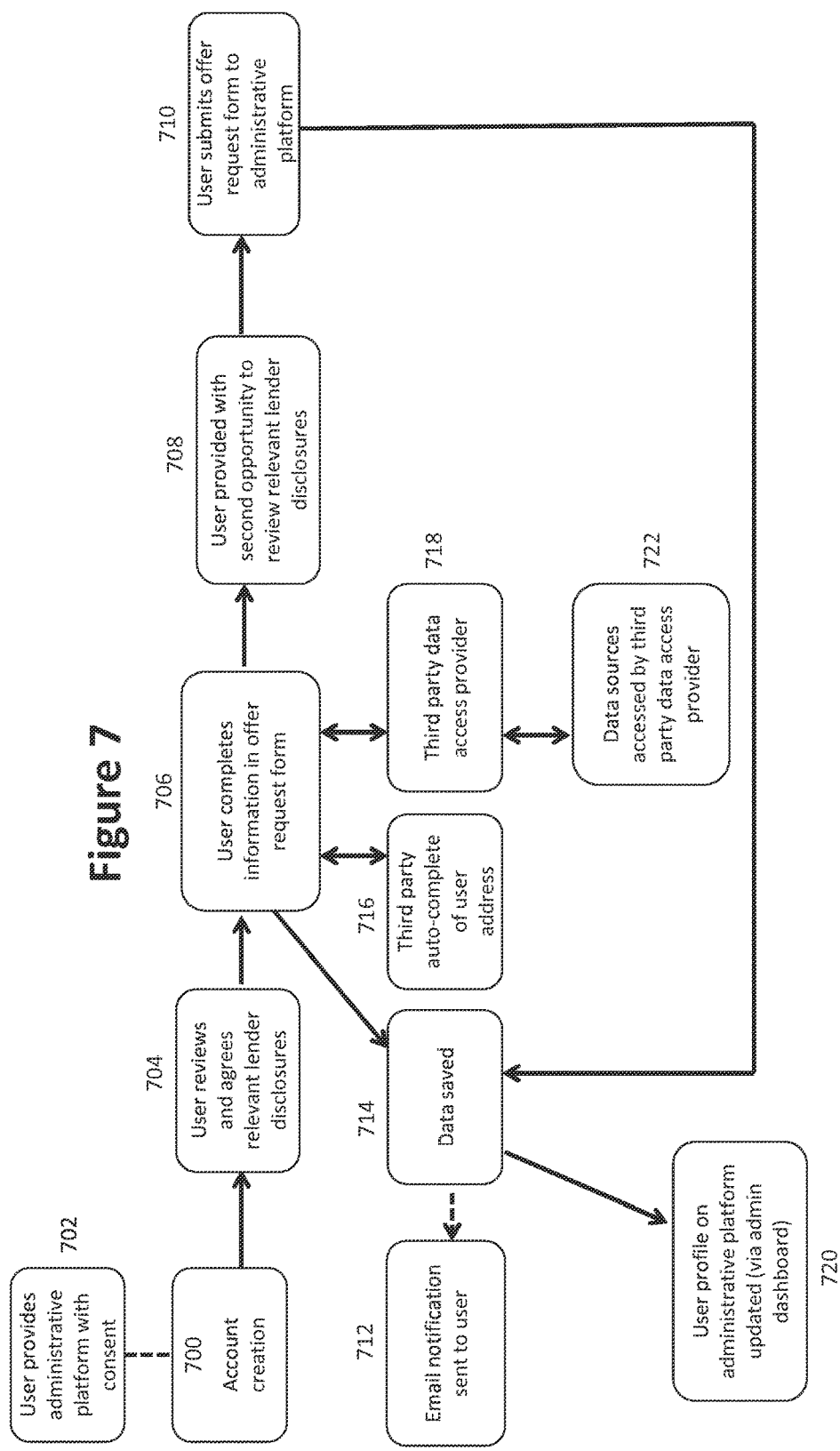
FIG. 7 is a flow chart diagram of the operation of the present invention relating to the offer request process in one embodiment of the invention.

FIG. 7 shows the step for the User to prepare the refinancing offer request evaluation data needed for seeking refinancing offers from lenders. When the User creates an account (702), the User consents to the use of their information for the purposes of, among others, the submission and offer retrieval process. The User is also presented with various lender disclosures so that various lender and legal requirements may be satisfied (704), the acceptance of which is time and date stamped. The User then completes information in offer request form (706) and the data is saved (714), with the User profile on the administrative platform being updated (720) on the admin dashboard plus the user is sent an email notification (712). In some embodiments, a third party program may be used to assist the User (716), for example a program that stores the User's personal information and maps it into data entry forms (716). In some embodiments, User data may be provided by a third party (414) directly (718) or indirectly (722) through another data source (412), optionally by website server (406) having autocomplete service (404). The User is then provided with a second opportunity to review and approve lender disclosure documents for every lender (708) that the User information will be submitted, the acceptance of which is time and date stamped. In some embodiments, the User maintains the ability to remove potential lenders from the list of lenders that their information is submitted to. Finally, when data entry is complete the User submits the offer request form to the administrative platform (710).

The offer request form, in several embodiments of the invention, has many data segments. First is the entry of the one or more student loans including the institution, amount, account number, interest rate, etc. In some embodiments, loan identification information may be entered and the administrative platform may obtain the information directly from the loan holding institution through the use of a third-party service to securely access the User's account information. In other embodiments, loan identification information may be manually entered by the User. Personal information such as name, age, date of birth, address, status, etc. may also be entered, typically information needed to perform lender processes for accurately identifying the User and, in some cases, obtaining a credit score. Further, the User may enter information about the User's current income and/or savings, and may designate a co-signer for the refinancing. Personal references may also be included, and other relevant documents may be uploaded to the administration web server for further submission to lenders where appropriate.

Figure 8:
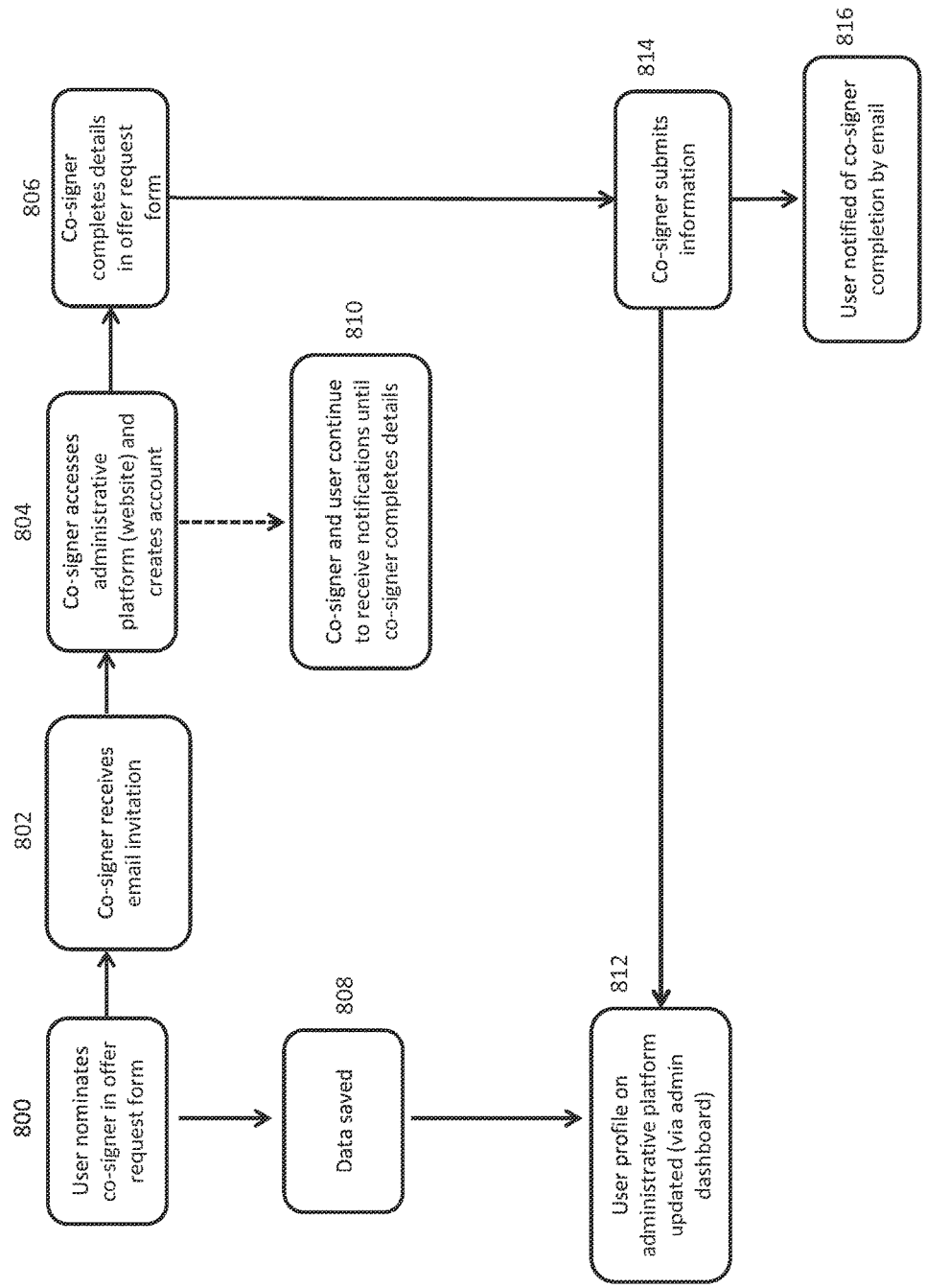
FIG. 8 is a flow chart diagram of the operation of the present invention relating to the co-signer process in one embodiment of the invention.

FIG. 8 shows the steps involved in having a co-signer involved in obtaining the binding refinancing offers. If during the process of FIG. 7 the User nominates a co-signer in the offer request form (800), the initial co-signer data is saved (808) in the user profile of the administrative platform via the admin dashboard (812). The co-signer is sent an email invitation (802). When the co-signer accepts the invitation, the co-signer then creates a co-signer account associated with the User account (804) and completes the required information in the co-signer section of the offer request form (806). While the co-signer information is incomplete, both the User and the co-signer will continue to receive notifications (810). The co-signer then submits the information to the administrative platform (814), which saves the data and notifies the User via email (816).

Figure 9:
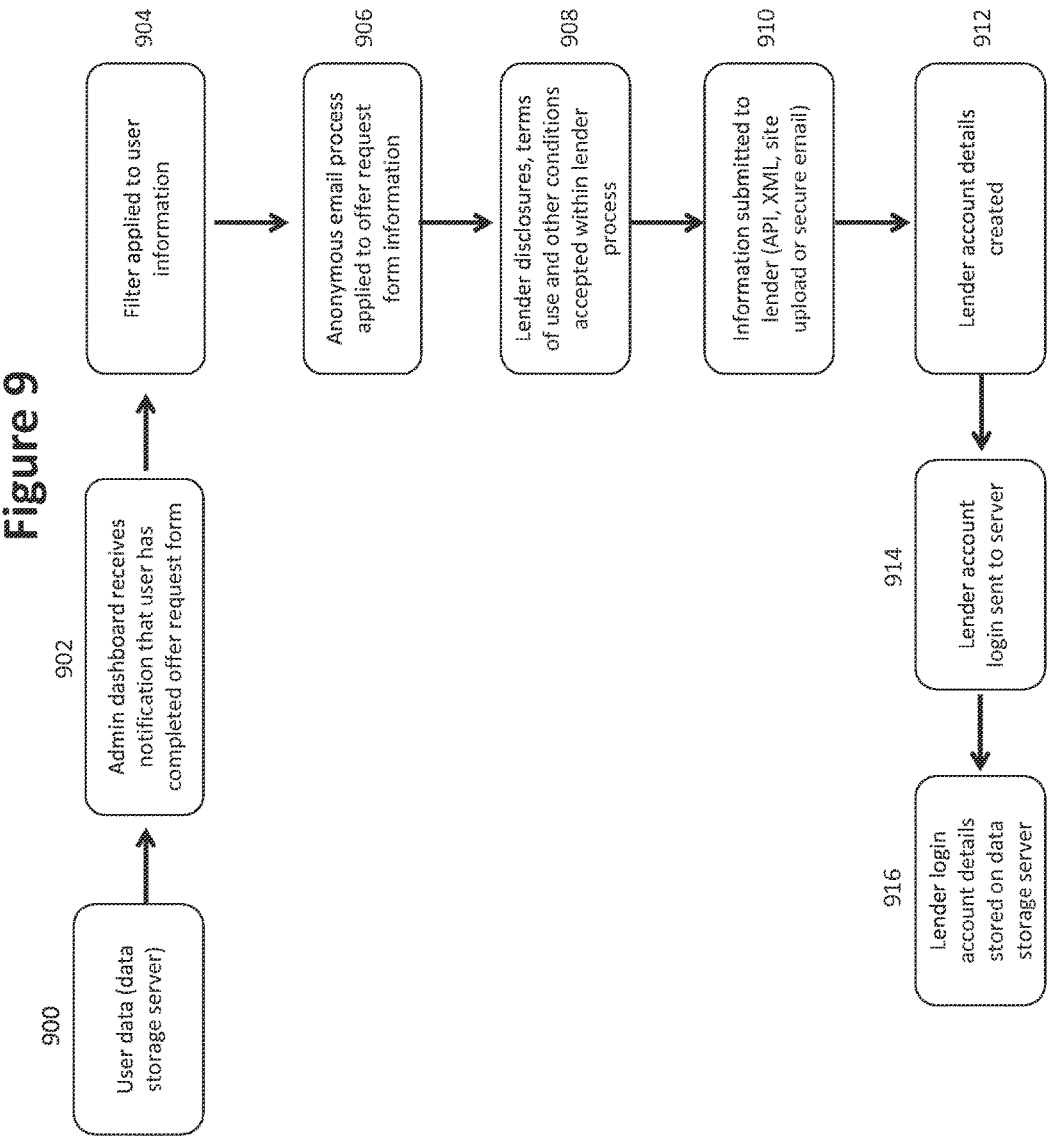
FIG. 9 is a flow chart diagram of the operation of the present invention relating to form submission in one embodiment of the invention for lenders not participating in the LDDM.

FIG. 9 shows the steps generally involved in the submission of the User's offer request form where lenders are not integrated with the LDDM, namely for direct submission lenders. After the User submits the User information (900) and that is saved to the Server along with previously mentioned time and date stamps, the administrative platform server receives notification of the completion (902) and applies information filter (426) to the User information (904), wherein the filter determines the portions of the User information to be used for the offer request submission. Each filter is lender specific, and may vary significantly from one lender to the next. In one embodiment, an XML or JSON transformation is made between the offer form from the administrative platform and the equivalent fields of the lender's data input. However, in several different embodiments the actual submission of information to the lender may take several forms. In any event, a proxy email server is used to interact with the lenders, for example by an API submission, uploading a document to a lender server, interactive online web form, or via a secure email transmission of a form email or an attached PDF document (910). The administrative platform, through its grant of rights to use the user information, e.g. by virtue of the recorded consents or a limited power of attorney from the User, accepts all lender disclosure requirements (908) and creates an account for the User with the lender (912), using the User's proxy email address to receive the User login information. Once the lender sends the User such login information (914), those details are stored in the data storage server (916) and populated on the admin dashboard associated with the User's account on the administrative platform. As the proxy email account is associated with the User under the User Authorization, the administrative platform may provide the User's information on behalf of the User for the purpose of requesting a conditional offer from lender(s) based on the submitted information.

Figure 10:
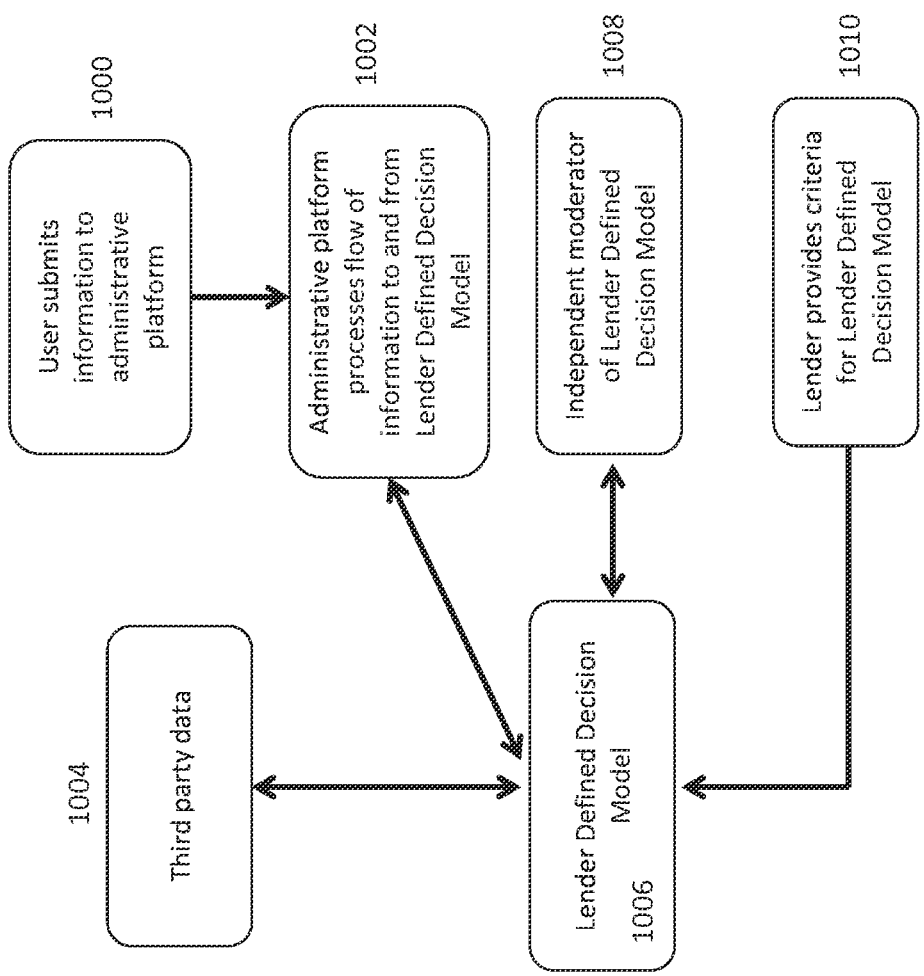
FIG. 10 is a flow chart diagram of the operation of the present invention relating to the LDDM in one embodiment of the invention.

In another embodiment of the invention, rather than the administrative platform submitting a User's information directly to the lender, the administrative platform facilitates a centralized location for the submission of previously provided user information known as the 'Lender Defined Decision Model' (LDDM) which is depicted in FIG. 10. LDDM (1006) is an independently moderated decision matrix which allows lenders to provide criteria relevant to their product decision process to a decision model functioning within the administrative platform. LDDM (1006) is protected by an independent third party (1008) which creates an information barrier or 'Chinese Wall' of sorts around the lender decision criteria so that those criteria may not be accessed by the operator of the administrative platform, thereby protecting the integrity of the LDDM and sensitive lender processes and information. The administrative platform provides user information to the LDDM in step (1002) after step (1000), along with various third party-accessed information from step (1004) required by the lenders to make a decision on a User's suitability for an offer, for example, credit reporting information relating to an individual user. The LDDM then takes all of the information required by a lender and generates a decision against the lender criteria in step (1008) on whether that User should be offered a loan refinancing product. The response to that calculation or decision is then provided back through the administrative platform and displayed on a User's dashboard account, and presented in the typical manner as though a lender had ordinarily responded to the User's offer request submission. The utility of this process being that rather than a User requiring multiple credit checks or a lender having to go through existing lengthy internal processes to provide a preliminary assessment of suitability for an offer, the process is simplified by virtue of one single credit check via third party information, and lender criteria for assessment of user suitability is contained within one central model.

Figure 11:
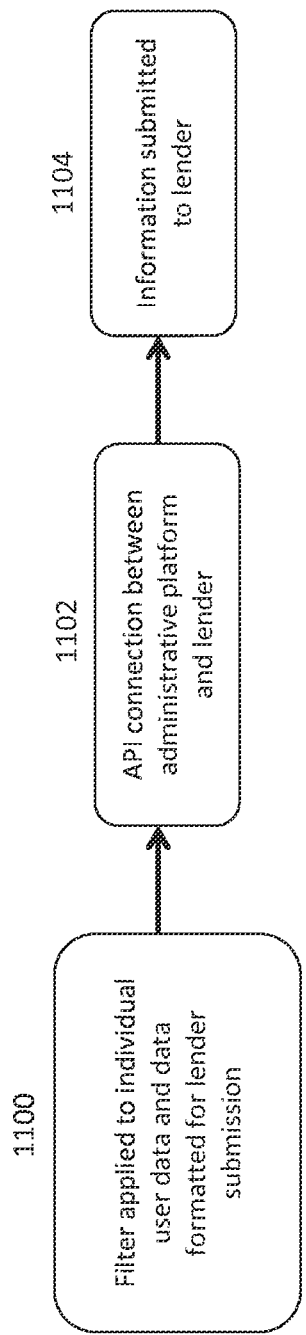
FIG. 11 is a flow chart diagram of the operation of the present invention relating to API submission in one embodiment of the invention.
Figure 12:
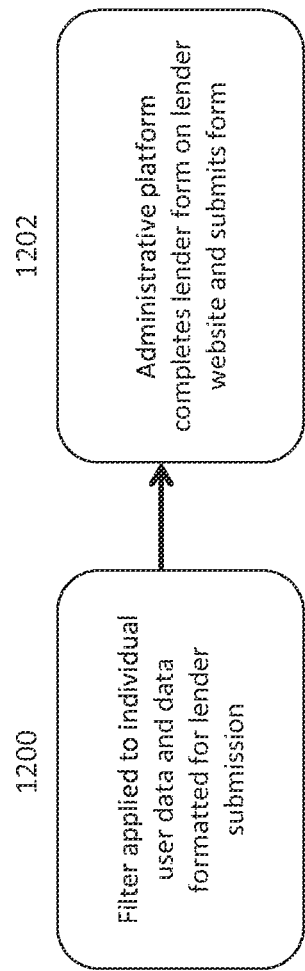
FIG. 12 is a flow chart diagram of the operation of the present invention relating to site upload in one embodiment of the invention.
Figure 13:
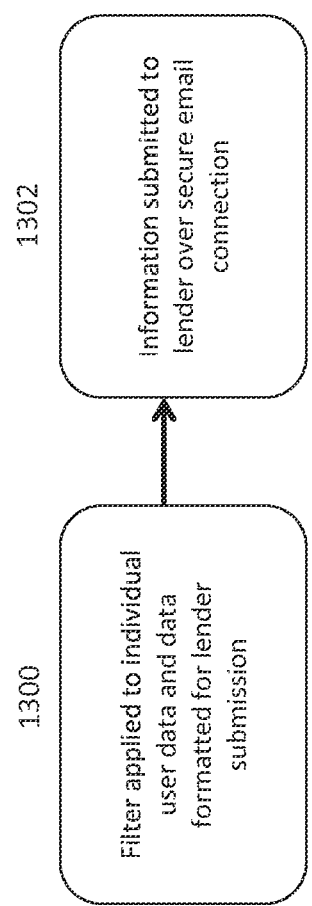
FIG. 13 is a flow chart diagram of the operation of the present invention relating to secure e-mail submissions in one embodiment of the invention.
Figure 14:
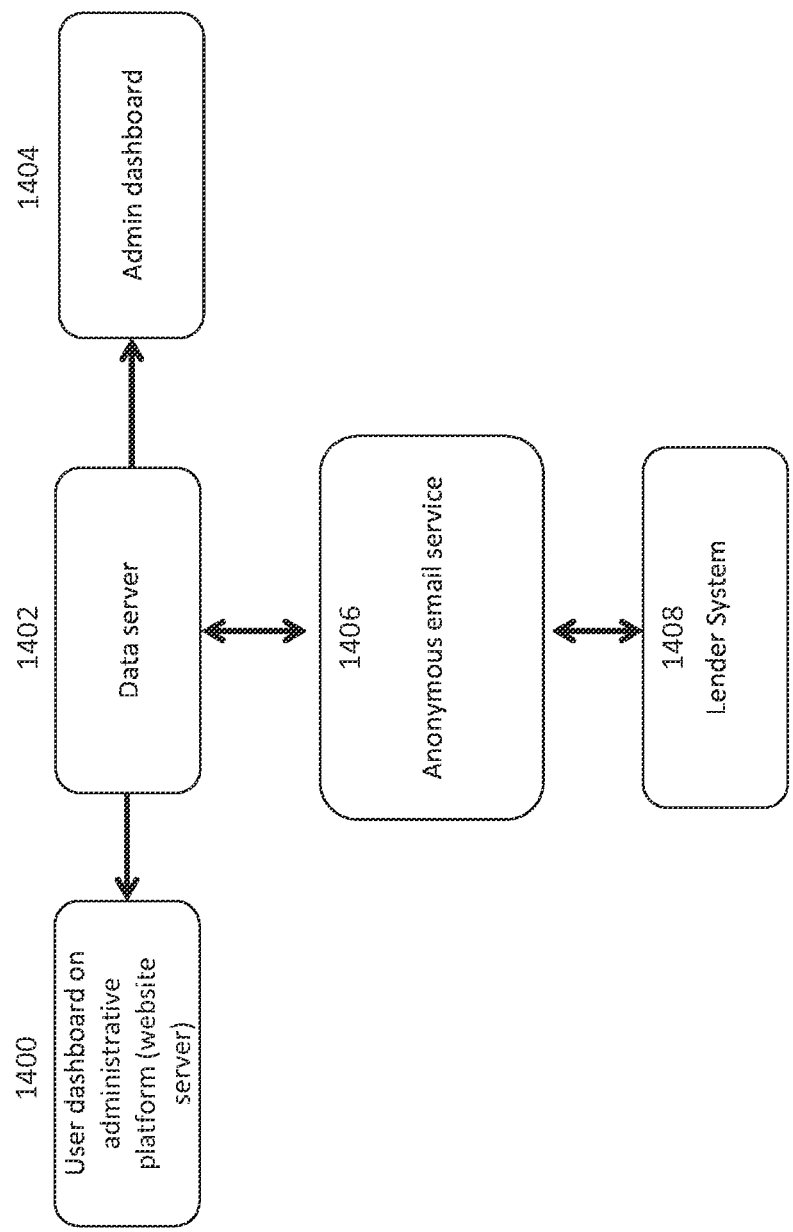
FIG. 14 is a flow chart diagram of the operation of the present invention relating to the system network inter relations anonymous e-mail in one embodiment of the invention.
Figure 15:
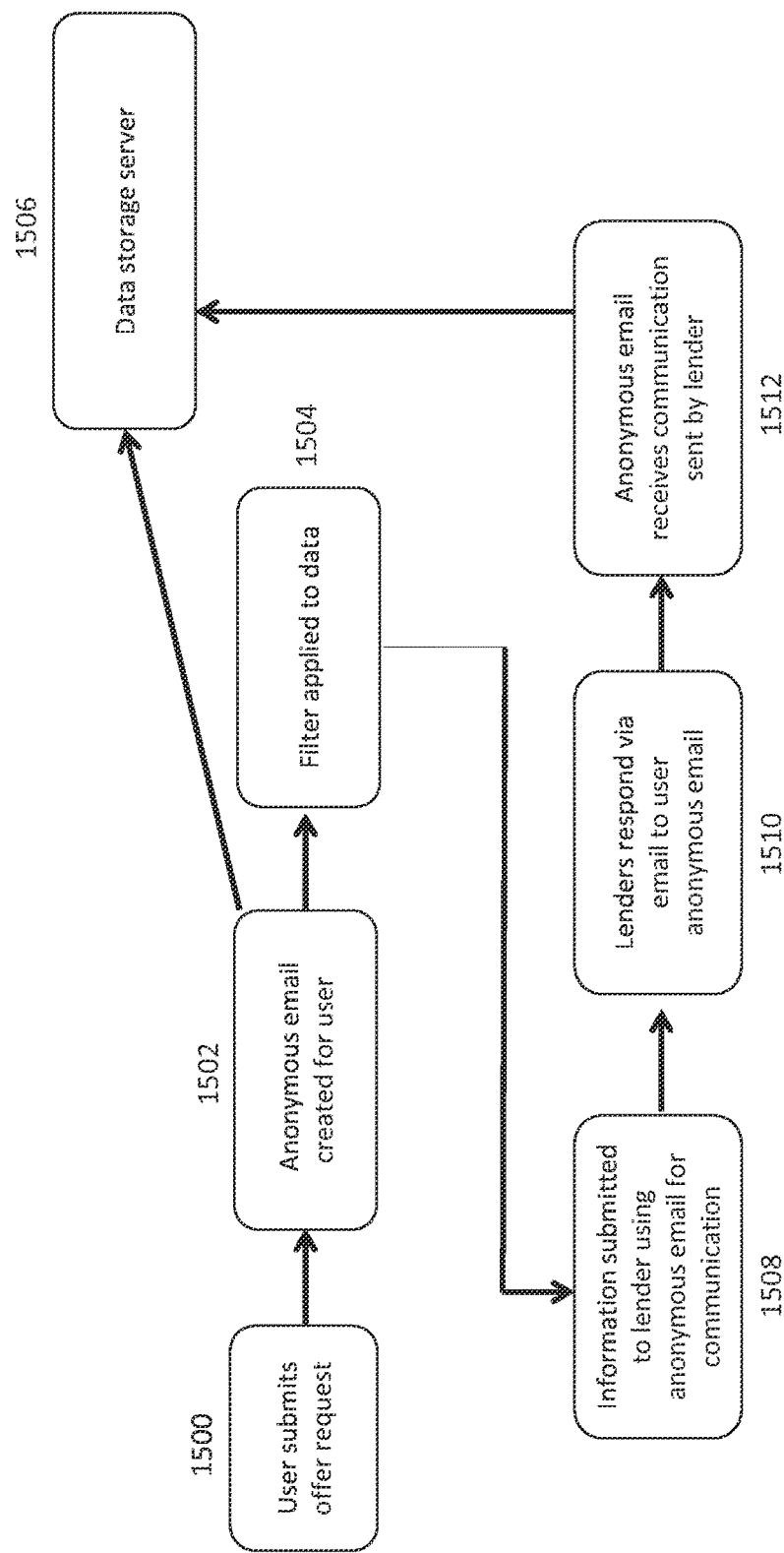
FIG. 15 is a flow chart diagram of the operation of the present invention relating to the anonymous e-mail in one embodiment of the invention.

FIGS. 11-13 show different ways, in several embodiments of the invention, for submitting the information contained in an offer request form directly to a lender, in some embodiments using the anonymous email system disclosed in FIGS. 14 and 15, and in other embodiments, following the election of a user to pursue an offer, as per step 336 in FIG. 3. In the embodiment of FIG. 11, with the previously submitted User information, the lender filter is applied (either internal filter required under direct submission to the lender, or whether that filter be the LDDM) (1100) and an API connection between the administrative platform and the lender is established (1102) and the information submitted to the lender (1104) with the appropriate acceptance of lender terms using User Authorization. In the embodiment of FIG. 12, again, the relevant filter is applied (1200) and through an automated script the filtered information is provided to the lender form on the lender website (1202), with the acceptance of lender disclosure terms and submission being accepted via the User Authorization. In the embodiment of FIG. 13, the relevant filter is applied and the User information is formatted in a way that the lender may understand (1300) (for example, PDF form, XML packet etc) which is submitted over a secure email connection (1302), again using the User Authorization for acceptance of lender disclosure terms and submission. In the embodiment of FIG. 14, the proxy email service's (1406) network connection (used in the case of lender direct submission) is described. Service (1406) acts as a buffer between the lender email system (1408) and the User by both notifying the User through the User Inbox (1400) and by storing the information received from the lender (1402) and making that information accessible to the User through the admin dashboard (1404). In the embodiment of FIG. 15, the system of processing the offer request (1500) through the email proxy service (1502) and filtering (1504) and is described, where the administrative platform creates an anonymous email (1502) for interaction where the offer request is sent directly to the lender (1508) and associated with the User, so that the lenders send emails to the anonymous email proxy (1510) allowing the administrative platform to manage communication with each lender (1512), including storing any supplementary information received from a lender (1506) and filtering that information for presentation to the User, which is authorized by the previous acceptance of the User Authorization.

Figure 16:
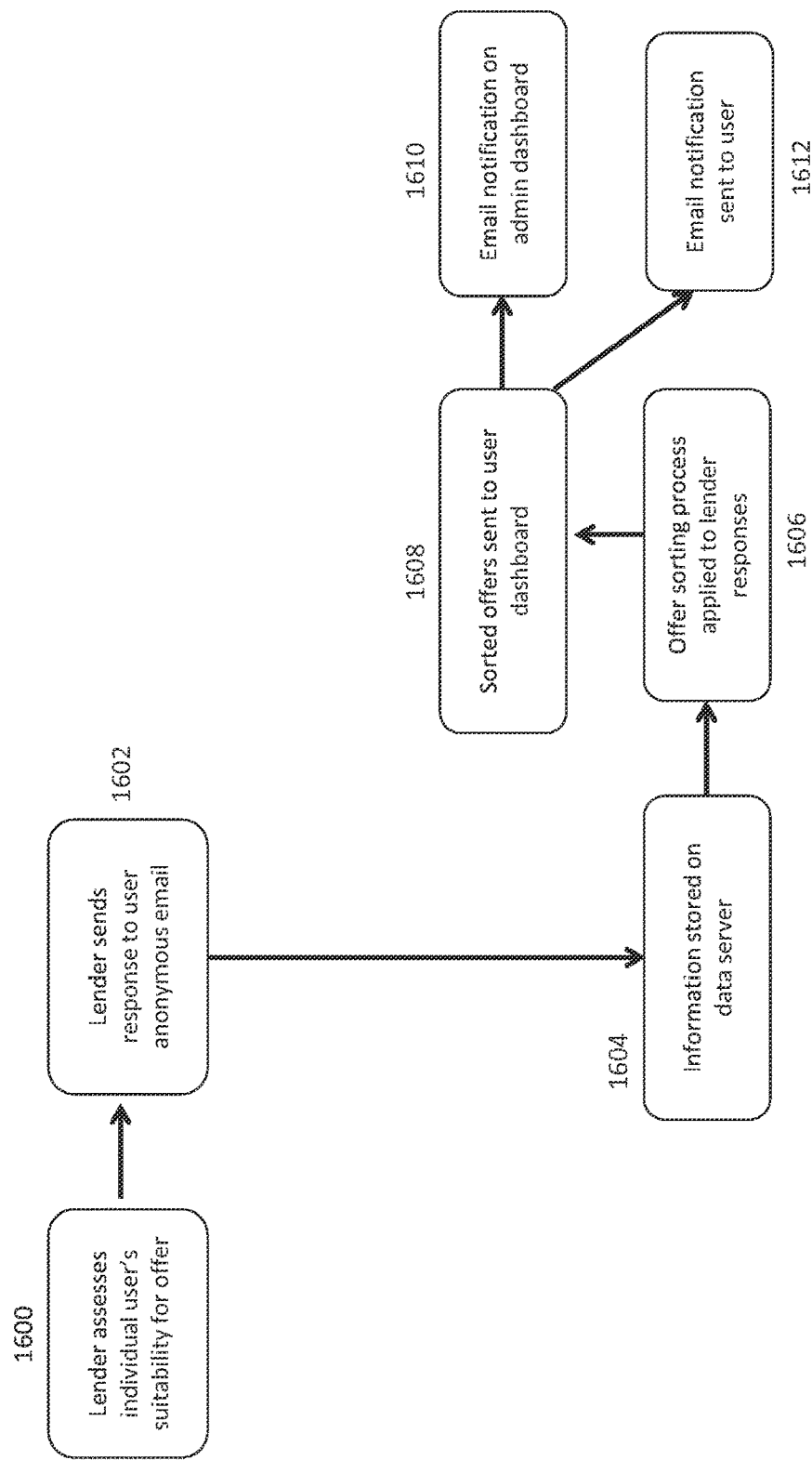
FIG. 16 is a flow chart diagram of the operation of the present invention relating to the lender response process in one embodiment of the invention.

FIG. 16 shows the interaction of the lender with the proxy email service in one embodiment of the present invention, used in the case of direct lender responses, in order to present a lender's response to a User on the administrative platform. First, where a User's information has been submitted directly to a lender, the lender applies its own process to assess the suitability for making an offer to a User (1600). This step is an internal process of the lender and not associated with any portion of the administrative platform. However, once the lender sends an online response to the User over the anonymous email associated with the lender-User pair (1602), which information is stored on the administrative platform data server (1604). As each conditional offer or lender response is received, the administrative platform applies an offer sorting process to the information received from lenders (1606) and sorted offers are sent to the user account on the administrative platform (user dashboard) (1608). An email is then sent to the User's personal email address (1612) containing a link to the lender response section of the User's account on the administrative platform (known as the User's 'dashboard'). The offer sorting process extracts certain information from each distinct offer sent, and presents the information in a predetermined arrangement to assist the User in evaluating the various offers sent in response to the information that the User provided (1608). A further email notification also appears on the internal mailing system within the User's dashboard (1610).

Figure 17:
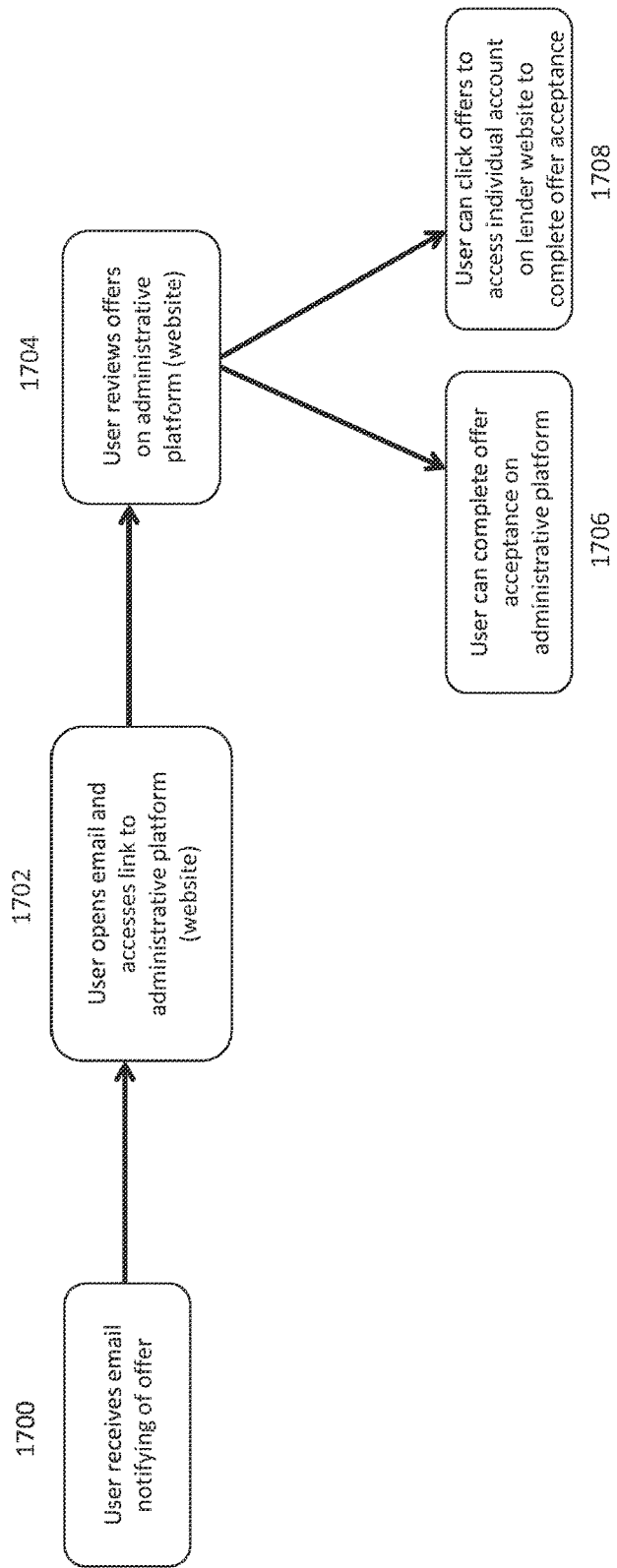
FIG. 17 is a flow chart diagram of the operation of the present invention relating to the user review offer process in one embodiment of the invention.

FIG. 17 shows one embodiment of the process of the User reviewing a response from a lender. After a lender assesses the User's suitability for receiving an offer, the lender response (either direct from lender or the LDDM) is populated, in the form of a conditional offer, rejection or other notification, into the admin dashboard of the administrative platform server. The User is then sent an email with a link containing a reference or URL to the lender's response (1700). The User receives the email and clicks on the link (1702) or alternatively logs into their User profile to obtain the dashboard listing of offers and/or other responses on the administrative platform (1704). In some embodiments, there is a further step required by lenders whereby a User clicks on the relevant lender's identifier (for example, logo/name) and be directed to the lender's website in order to view the lender's offer. Depending on the lender, a User will have the ability to either complete their offer acceptance on the administrative platform (1706) or through their unique account on the lender's website (1708).

FIG. 18 shows the steps involved in a User interacting with the administrative platform to obtain further benefits based on the aggregation of users. After the User completes and submits the offer request form (1800), the User is given the option to invite friends and other connections so that Users within the invited group may receive benefits such as group discounts if a sufficient number of friends also select an offer once completing the offer request process (1802). Should the User select the group discount option, a time period commences, in one embodiment a thirty day period, in which friends or associates may be invited to participate in submitting an offer request form through the administrative platform (1804). Such invitations may be done through conventional email, or through social network private mail and/or posting to a social network account. The administrative platform's admin dashboard tracks all of the friends and other connections identified by the User and manages the interaction with those friends as a "micro-campaign" using conventional email marketing techniques (1806), and referral fees are payable to members of the "micro-campaign" group based on the number of identified friends and other connections that have also used the administrative platform to pursue refinancing offers (1808). In some embodiments, a minimum number of friends must refinance, for example five, in order for the group to receive the benefits of a "micro-campaign"

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A server for coordinating multiple vendor requests from a single user, said server comprising:
   a hardware processor and associated memory;
   a network communications system associated with said processor and memory;
   a user interaction module configured to obtain user information and store user information, including a User Authorization module for storing of user authentication and user affirmation;
   a vendor interaction module configured to obtain vendor information requirements and fulfill vendor information requirements from the stored user information, wherein the vendor interaction module provides stored user information to a vendor server using an application program interface (API), an interactive connection, a browser based applet, and a file transfer protocol transmission;
   an API integration module configured to transform information in a format incompatible with multiple vender processes into a format compatible with multiple vendor processes, and a decision module configured to apply vendor information requirements and user information, the decision module configured to communicate acceptance of user compliance with vendor information requirements, wherein the decision module includes: 1) an anonymous email interaction module for creating anonymous emails accounts for managing interaction of a user with a vendor, said anonymous email interaction module creating an e-mail account for the vendor interaction module to use to communicate with the vendors, said anonymous email interaction module managing email to the user through the user interaction module, and 2) an independently moderated decision matrix protected by an independent third party in order to create an information barrier around vendor information requirements; and a comparison tool module configured to compare basic loan information to a pre-aggregated data set, the comparison tool being further configured to provide comparison results to the user through an administrative platform.

2. The server of claim 1 wherein the decision module includes an independent evaluation module that independently determines user information compliance with vendor information requirements.

3. The server of claim 1 wherein the User Authorization module is adapted to perform multiple times for each user interaction.

4. The server of claim 1 wherein the User Authorization module is adapted to store dated and time-stamped information.

5. The server of claim 1 wherein the User Authorization module stores user affirmation of user consent.

6. The server of claim 5 wherein the User Authorization module stores the details of the user consent.

7. The server of claim 1 wherein the User Authorization module stores user affirmation of a limited power of attorney.

8. The server of claim 1 wherein the vendor interaction module provides stored user information to a vendor server using an interactive connection.

9. The server of claim 1 wherein the vendor interaction module provides stored user information to a vendor server using a browser based applet.

10. The server of claim 1 wherein the vendor interaction module provides stored user information to a vendor server using a file transfer protocol transmission.

11. A method for coordinating multiple vendor requests for a transaction from a single user using a server, said method comprising the steps of:

obtaining user information related to the transaction by communication with a user computer over a network;

obtaining User Authorization by communication with a user computer over a network, the User Authorization including user authentication and user affirmation;

storing the user information, user authentication and user affirmation;

transforming the user information from a format incompatible with multiple vender processes into a format compatible with multiple vendor processes;

fulfilling vendor information requirements from the stored user information using a vendor interaction module, wherein the vendor interaction module provides stored user information to a vendor server using an application program interface (API), an interactive connection, a browser based applet, and a file transfer protocol transmission;

transforming information, via an API integration module, in a format incompatible with multiple vender processes into a format compatible with multiple vendor processes;

operating a decision module for applying vendor information requirements and user information, the decision module also for communicating acceptance of user compliance with vendor information requirements, wherein the decision module includes: 1) an anonymous email interaction module for creating anonymous emails accounts for managing interaction of a user with a vendor, said anonymous email interaction module creating an e-mail account for the vendor interaction module to use to communicate with the vendors, said anonymous email interaction module managing email to the user through the user interaction module, and 2) an independently moderated decision matrix protected by an independent third party in order to create an information barrier around vendor information requirements;

comparing basic loan information to a pre-aggregated data set; and providing comparison results to the user through an administrative platform.

12. The method of claim 11 wherein the operating step involves operating an independent evaluation module for independently determining user information compliance with vendor information requirements.

13. The method of claim 11 wherein the step of obtaining User Authorization module is performed multiple times for the user.

14. The method of claim 11 wherein the step of obtaining User Authorization includes obtaining dated and time-stamped information.

15. The method of claim 11 wherein the step of obtaining User Authorization includes obtaining user affirmation of user consent.

16. The method of claim 15 wherein the step of obtaining User Authorization also includes associating the details of the user consent.

17. The method of claim 11 wherein the step of obtaining User Authorization includes obtaining user affirmation of a limited power of attorney.

18. The method of claim 11 wherein the step of fulfilling vendor information includes providing stored user information to a vendor server using an interactive connection.

19. The method of claim 11 wherein the step of fulfilling vendor information includes providing stored user information to a vendor server using a browser based applet.

20. The method of claim 11 wherein the step of fulfilling vendor information includes providing stored user information to a vendor server using a file transfer protocol transmission.

* * * * *